US009589240B2

(12) United States Patent
Rangaswamy et al.

(10) Patent No.: US 9,589,240 B2
(45) Date of Patent: Mar. 7, 2017

(54) SYSTEM AND METHOD FOR FLEXIBLE CHAINING OF DISTINCT WORKFLOW TASK INSTANCES IN A BUSINESS PROCESS EXECUTION LANGUAGE WORKFLOW

(75) Inventors: Ravi Rangaswamy, Fremont, CA (US); Bhagat Nainani, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 12/780,661

(22) Filed: May 14, 2010

(65) Prior Publication Data

US 2011/0282707 A1 Nov. 17, 2011

(51) Int. Cl.
*G06Q 10/00* (2012.01)
*G06Q 10/06* (2012.01)

(52) U.S. Cl.
CPC ......... *G06Q 10/06* (2013.01); *G06Q 10/0633* (2013.01); *G06Q 10/06316* (2013.01)

(58) Field of Classification Search
CPC ...... G06Q 10/06; G06Q 10/103; G06Q 10/00; G06Q 40/00; G06F 17/60
USPC ........................................................ 705/7.11
See application file for complete search history.

(56) References Cited

U.S. PATENT DOCUMENTS

| | | | | |
|---|---|---|---|---|
| 5,721,913 A * | 2/1998 | Ackroff et al. | | |
| 5,799,297 A | 8/1998 | Goodridge et al. | | |
| 5,930,512 A * | 7/1999 | Boden et al. | | 717/102 |
| 5,978,836 A * | 11/1999 | Ouchi | | 709/206 |
| 5,999,911 A * | 12/1999 | Berg et al. | | 705/7.26 |
| 6,003,011 A * | 12/1999 | Sarin et al. | | 705/7.26 |
| 6,026,365 A * | 2/2000 | Hayashi | | 705/7.26 |
| 6,161,113 A * | 12/2000 | Mora et al. | | 715/234 |
| 6,170,002 B1 * | 1/2001 | Ouchi | | 709/206 |
| 6,308,224 B1 * | 10/2001 | Leymann et al. | | 719/310 |
| 6,349,287 B1 * | 2/2002 | Hayashi | | 705/7.26 |
| 6,397,182 B1 * | 5/2002 | Cruickshank et al. | | 704/256.1 |
| 6,397,191 B1 * | 5/2002 | Notani et al. | | 705/7.26 |
| 6,411,314 B1 * | 6/2002 | Hansen et al. | | 715/769 |
| 6,470,227 B1 * | 10/2002 | Rangachari et al. | | 700/95 |
| 6,507,845 B1 * | 1/2003 | Cohen et al. | | 707/608 |
| 6,519,642 B1 * | 2/2003 | Olsen et al. | | 709/227 |
| 6,567,783 B1 * | 5/2003 | Notani et al. | | 705/7.26 |

(Continued)

OTHER PUBLICATIONS

Bradshaw, Deanna et al., Oracle BPEL Process Manager Developer's Guide 10g (10.1.3.1.0) Oracle, Jan. 2007.*

(Continued)

*Primary Examiner* — Romain Jeanty
(74) *Attorney, Agent, or Firm* — Tucker Ellis LLP

(57) ABSTRACT

Systems and methods are described for providing task chaining as part of modeling a business process (e.g. a BPEL process). Chained tasks maintain a reference to the previous task and during retrieval of that task, the system can append relevant information, including but not limited to task history, attachments and comments of the previous task. Task chaining can be enabled by selecting a previously completed task and marking that the current task chains the selected task. In one embodiment, tasks are chained across multiple instances of a process. Accordingly, tasks in different processes can be chained together to obtain access to the same context information and other data.

18 Claims, 4 Drawing Sheets

(56) References Cited

U.S. PATENT DOCUMENTS

| | | | |
|---|---|---|---|
| 6,574,675 B1* | 6/2003 | Swenson | 719/316 |
| 6,574,736 B1 | 6/2003 | Andrews | |
| 6,584,487 B1* | 6/2003 | Saboff | 718/100 |
| 6,606,740 B1* | 8/2003 | Lynn et al. | 717/100 |
| 6,725,428 B1* | 4/2004 | Pareschi et al. | 715/205 |
| 6,742,015 B1 | 5/2004 | Bowman-Amuah | |
| 6,792,604 B1* | 9/2004 | Hickson et al. | 719/312 |
| 6,889,231 B1* | 5/2005 | Souder et al. | |
| 6,895,573 B2 | 5/2005 | Nørgaard et al. | 717/100 |
| 6,970,844 B1* | 11/2005 | Bierenbaum | 705/39 |
| 6,988,139 B1* | 1/2006 | Jervis et al. | 709/226 |
| 7,020,697 B1 | 3/2006 | Goodman et al. | |
| 7,062,749 B2 | 6/2006 | Cyr et al. | |
| 7,080,099 B2* | 7/2006 | Tada et al. | 707/771 |
| 7,117,500 B2* | 10/2006 | Pulsipher et al. | 718/105 |
| 7,155,720 B2* | 12/2006 | Casati et al. | 718/104 |
| 7,236,939 B2* | 6/2007 | Chen et al. | 705/7.13 |
| 7,266,764 B1* | 9/2007 | Flam | 715/209 |
| 7,272,816 B2* | 9/2007 | Schulz et al. | 717/104 |
| 7,289,966 B2* | 10/2007 | Ouchi | 705/7.13 |
| 7,356,611 B1* | 4/2008 | Stork et al. | 709/239 |
| 7,370,335 B1* | 5/2008 | White et al. | 719/328 |
| 7,403,989 B2* | 7/2008 | Beringer et al. | 709/223 |
| 7,406,432 B1* | 7/2008 | Motoyama | 705/7.16 |
| 7,418,475 B2 | 8/2008 | Stewart et al. | |
| 7,428,495 B2* | 9/2008 | Dhar et al. | 705/7.26 |
| 7,448,046 B2* | 11/2008 | Navani et al. | 719/316 |
| 7,464,366 B2* | 12/2008 | Shukla et al. | 717/100 |
| 7,493,593 B2* | 2/2009 | Koehler | 717/106 |
| 7,498,866 B2* | 3/2009 | Choi | 327/536 |
| 7,519,711 B2* | 4/2009 | Mohindra et al. | 709/226 |
| 7,543,292 B2 | 6/2009 | Haller et al. | |
| 7,603,674 B2 | 10/2009 | Cyr et al. | |
| 7,631,291 B2* | 12/2009 | Shukla et al. | 717/107 |
| 7,653,562 B2* | 1/2010 | Schulz et al. | 705/7.27 |
| 7,676,483 B2* | 3/2010 | Klug | 703/6 |
| 7,680,683 B2* | 3/2010 | Hilerio et al. | 705/7.27 |
| 7,685,604 B2* | 3/2010 | Baartman et al. | 719/313 |
| 7,702,736 B2* | 4/2010 | Ouchi | 709/206 |
| 7,814,142 B2* | 10/2010 | Mamou et al. | 709/203 |
| 7,899,679 B2 | 3/2011 | MacKay et al. | |
| 7,925,527 B1* | 4/2011 | Flam | 705/7.14 |
| 8,112,257 B2* | 2/2012 | Weber et al. | 703/6 |
| 8,146,083 B2* | 3/2012 | Aggarwal et al. | 718/100 |
| 8,170,897 B1 | 5/2012 | Cohen et al. | |
| 8,250,576 B2* | 8/2012 | Yildiz et al. | 718/100 |
| 8,321,257 B2* | 11/2012 | Motoyama et al. | 705/7.22 |
| 8,417,682 B2* | 4/2013 | Wilcox et al. | 707/705 |
| 8,793,807 B2 | 7/2014 | Claussen | |
| 9,020,831 B2 | 4/2015 | Simske | |
| 2002/0140731 A1 | 10/2002 | Subramaniam et al. | |
| 2002/0178119 A1 | 11/2002 | Griffin et al. | |
| 2002/0189070 A1* | 12/2002 | Noel et al. | 29/509 |
| 2003/0046576 A1 | 3/2003 | High et al. | |
| 2003/0079180 A1* | 4/2003 | Cope | 715/511 |
| 2003/0105974 A1 | 6/2003 | Griffin et al. | |
| 2003/0135384 A1 | 7/2003 | Nguyen | |
| 2003/0158832 A1 | 8/2003 | Sijacic et al. | |
| 2004/0230466 A1* | 11/2004 | Davis et al. | 705/8 |
| 2005/0027585 A1* | 2/2005 | Wodtke et al. | 705/9 |
| 2005/0049924 A1* | 3/2005 | DeBettencourt et al. | 705/21 |
| 2005/0071347 A1* | 3/2005 | Chau et al. | 707/100 |
| 2005/0097166 A1 | 5/2005 | Patrick et al. | |
| 2006/0069995 A1* | 3/2006 | Thompson et al. | 715/700 |
| 2006/0074703 A1* | 4/2006 | Bhandarkar et al. | 705/1 |
| 2006/0074734 A1* | 4/2006 | Shukla et al. | 705/8 |
| 2006/0074915 A1* | 4/2006 | Bhandarkar et al. | 707/9 |
| 2006/0150156 A1 | 7/2006 | Cyr et al. | |
| 2006/0173869 A1 | 8/2006 | Byrne et al. | |
| 2006/0224432 A1 | 10/2006 | Li | |
| 2006/0229925 A1 | 10/2006 | Chalasani et al. | |
| 2006/0259524 A1* | 11/2006 | Horton | 707/201 |
| 2007/0016465 A1* | 1/2007 | Schaad | 705/9 |
| 2007/0061382 A1 | 3/2007 | Davis et al. | |
| 2007/0061776 A1 | 3/2007 | Ryan et al. | |
| 2007/0156486 A1* | 7/2007 | Sanabria et al. | 705/8 |
| 2007/0203589 A1* | 8/2007 | Flinn et al. | 700/29 |
| 2007/0203881 A1 | 8/2007 | Schaad et al. | |
| 2007/0239499 A1 | 10/2007 | Shukla et al. | |
| 2007/0240112 A1 | 10/2007 | Haselden et al. | |
| 2007/0276715 A1* | 11/2007 | Beringer et al. | 705/7 |
| 2008/0065656 A1 | 3/2008 | Theeten et al. | |
| 2008/0114627 A1* | 5/2008 | Baeuerle et al. | 705/7 |
| 2008/0114791 A1* | 5/2008 | Takatsu et al. | 707/100 |
| 2008/0282250 A1 | 11/2008 | Marin et al. | |
| 2008/0301684 A1* | 12/2008 | Barros et al. | 718/102 |
| 2008/0306806 A1 | 12/2008 | Van Wyk et al. | |
| 2009/0125366 A1* | 5/2009 | Chakraborty et al. | 705/9 |
| 2009/0164985 A1* | 6/2009 | Balko et al. | 717/162 |
| 2009/0249293 A1* | 10/2009 | Davies | 717/116 |
| 2009/0260021 A1 | 10/2009 | Haenel et al. | |
| 2009/0281865 A1 | 11/2009 | Stoitsev | |
| 2009/0307162 A1 | 12/2009 | Bui et al. | |
| 2010/0049574 A1 | 2/2010 | Paul et al. | |
| 2010/0100427 A1 | 4/2010 | McKeown et al. | |
| 2010/0106546 A1 | 4/2010 | Sproule | |
| 2010/0131916 A1* | 5/2010 | Prigge | 717/104 |
| 2010/0205013 A1 | 8/2010 | Guyan et al. | |
| 2010/0223570 A1 | 9/2010 | Gerstl | |
| 2010/0235213 A1* | 9/2010 | Channabasavaiah et al. | 705/9 |
| 2010/0251242 A1* | 9/2010 | Sivasubramanian et al. | 718/100 |
| 2011/0078499 A1 | 3/2011 | Fong et al. | |

OTHER PUBLICATIONS

Beecher, Virginia et al., Oracle Fusion Middleware Developers Guide for Oracle SOA Suite, 11g Oracle, Dec. 2009.*

Oracle Database Administrators Guide 11g Oracle, Mar. 2008.*

Oracle BPEL Process Manager—Data Sheet Oracle, 2009.*

Rittman, Mark, Oracle Purchases Collaxa, Launchs Oracle BPEL Processs Manager RittmanMead.com, Jun. 30, 2004.*

Clugage, Kevin et al., The Oracle BPEL Process Manager: BPEL + Human Workflow Oracle, Mar. 14, 2006.*

BPEL4People—wikipedia definition Wikipedia.org, Retrieved Apr. 10, 2012.*

Kloppman, Matthias et al., WS-BPEL Extension for People—BPEL4People IBM, SAP, White paper, Jul. 2005.*

Collaxa WSOS 2.0: An introduction Collaxa, Sep. 6, 2002.*

Kennedy, Mark, Oracle BPEL Process Manager Quick Start Guide, 10g Oracle, Sep. 2006.*

Liu, Sa, Business Process Automation and Web Service Choreography Technische Universitat Hamburg-Harburg, Jun. 29, 2004.*

Collaxa—Orchestration Server Developers Guide Verion 2.0 Beta 2 Collaxa, 2002.*

Kloppman, Matthias et al., WS-BPEL Extension for Sub-Processes—BPEL SPE IBM, SAP, Sep. 2005.*

Agrawal, Ashish et al., Web Service Human Task (WS-HumanTask), Version 1.0 Active Endpoints, Inc., 2007.*

Agrawal, Ashish et al., WS-BPEL Extension for People (BPEL4People), Version 1.0 Active Endpoints, Inc., 2007.*

Workflow Management Coalition—Workflow Standarind Interoperability Abstract Specification the Workflow Management Coalition, Version 2.0b, Nov. 30, 1999.*

Oracle Workflow—Developers Guide Release 12 Oracle, Dec. 2006.*

Oracle BPEL Process Manager—Quick Start Guide 10g Oracle, Sep. 2006.*

Creating a Human Workflow Task—Section 7.12, Oracle SOA Suite Developers Guide 10g Oracle, 2006.*

TrackWise User's Guide Sparta Systems, Inc., 2000.*

Alves, et al., Web Services Business Process Execution Language Version 2.0, Oasis Standard, Apr. 11, 2007, 264 pages.

United States Patent and Trademark Office, Office Action Dated Nov. 18, 2016 for U.S. Appl. No. 12/780,183, 10 pages.

* cited by examiner

SYSTEM AND METHOD FOR FLEXIBLE CHAINING OF DISTINCT WORKFLOW TASK INSTANCES IN A BUSINESS PROCESS EXECUTION LANGUAGE WORKFLOW

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, which are each hereby incorporated by reference in their entirety:

U.S. patent application Ser. No. 12/780,183, titled "COMPLEX ACCESS CONTROL", inventors Vladimir Svetov et al., filed May 14, 2010;

U.S. patent application Ser. No. 12/780,340, titled "INTEGRATING EXTERNAL DATA IN HUMAN WORKFLOW TASKS", inventors Ravi Rangaswamy et al., filed May 14, 2010;

U.S. patent application Ser. No. 12/780,348, titled "WORKFLOW TASK ROUTING BASED ON CARDINALITY OF TASK DATA", inventors Ravi Rangaswamy et al., filed May 14, 2010;

U.S. patent application Ser. No. 12/780,214, titled "SYSTEM AND METHOD FOR LOGICAL PEOPLE GROUPS", inventors Ravi Rangaswamy et al., filed May 14, 2010; and U.S. patent application Ser. No. 12/780,356, titled "DYNAMIC HUMAN WORKFLOW TASK ASSIGNMENT USING BUSINESS RULES", inventors Ravi Rangaswamy et al., filed May 14, 2010.

FIELD OF THE INVENTION

The current invention relates generally to process management systems and more particularly to providing an ability to maintain context information across chained human tasks in a workflow process.

BACKGROUND

Within large business enterprises, management of business processes is becoming a more significant issue as companies vie to improve efficiency, reduce costs, increase profits and gain more flexible and dynamic infrastructures. Business processes are a part of the day-to-day operations and services of any corporation. In this context, a business process can be thought of as a series of steps (tasks) that are executed in a particular order or path in order to achieve an objective in an organization. For example, a business process may include applying for a home loan (e.g. loan origination process), starting a mobile phone service (account initiation process), hiring a new employee (employee on-boarding process), building a new jet engine (parts and assembly process), as well as countless other processes performed by enterprises and organizations in order to accomplish specific goals. Processes can range from very simple to highly complex and sophisticated, involving numerous decisions, tasks and activities. A business process can be visualized as a flowchart of a sequence of activities. Business processes often change over time and are useful for analyzing and optimizing the business model of a particular organization.

Various software systems have been developed to enable business processes to be defined in a computer language that can be directly executed by a computer. These systems use automated applications in conjunction with human based tasks to graphically construct, deploy and execute business processes, as well as maintain, analyze and modify them over time. Compared to previous approaches, using such automated software systems to directly execute processes can be more straightforward and easier to improve. Accordingly, more and more organizations are using software business process systems to integrate the data, applications and processes into a unified system.

As one example, business process execution language (BPEL) has been developed to define business processes that use Web Services to interact with other entities. BPEL is a standard executable orchestration language that specifies interactions with Web Services. The BPEL processes are represented in extensible markup language (XML) and these processes orchestrate synchronous and asynchronous services into end-to-end flows. By implementing software tools like BPEL, enterprises are able to increase productivity, performance, profits, decrease inefficiency due to various factors and otherwise optimize various tasks.

Even with the rising popularity of BPEL based and other similar systems (e.g. BPMN), however, there exists a multitude of shortcomings and other needs in this area of technology. For example, designing a process in such a system typically involves designating both automated tasks and human oriented tasks as part of the overall workflow. Thus, in many of these scenarios, human tasks approvals have to be intermixed with automated activities. When such mixing of automated activities and human tasks occur, human approvals lose context of the previous human actions. In the past, business process systems separated approvals without the context of the previous approvals. However, this could result in loss in history of the task and data such as coments and attachments in the previous human task approval. Other systems had customers copy such data in the process or client implementation, adding more complexity and work on the part of the user. What is needed is a more dynamic and automated system that can carry the context of human tasks throughout chained processes in an efficient manner.

SUMMARY OF INVENTION

In this specification, systems and methods are described for providing task chaining as part of modeling a business process (e.g. a BPEL process, BPMN process, etc.). Chained tasks maintain a reference to the previous task and during retrieval of that task, the system can append relevant information, including but not limited to task history, attachments and comments of the previous task. Task chaining can be enabled by selecting a previously completed task and marking that the current task chains the selected task. In one embodiment, tasks are chained across multiple instances of a process. Accordingly, tasks in different processes can be chained together to obtain access to the same context information and other data.

DETAILED DESCRIPTION

Figure 1:
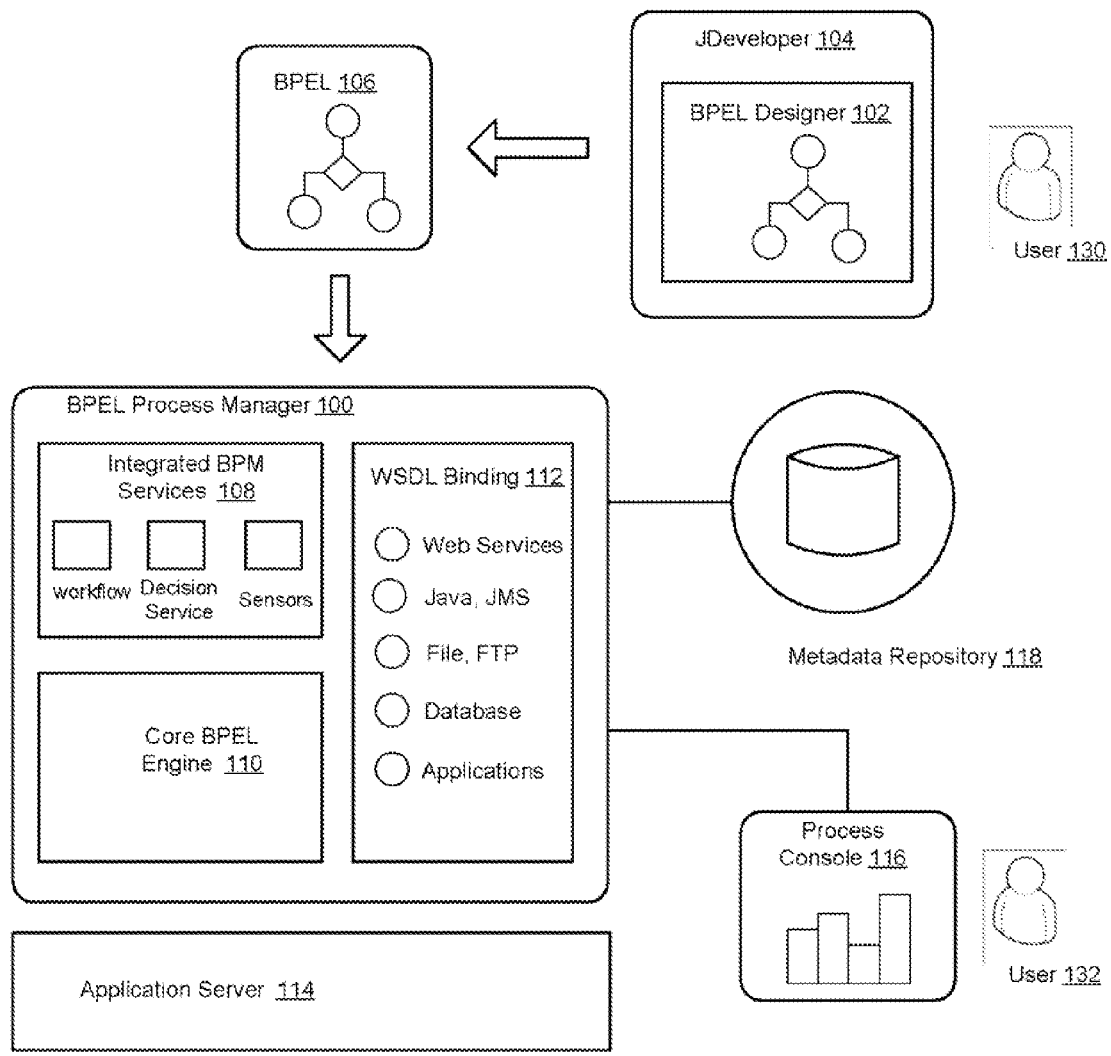
FIG. 1 is an illustration of a BPEL system in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The embodiments of the present invention encompass systems and methods for providing task chaining as part of modeling a business process (e.g. a BPEL process). Chained tasks maintain a reference to the previous task and during retrieval of that task, the system can append relevant information, including but not limited to task history, attachments and comments of the previous task. Task chaining can be enabled by selecting a previously completed task and marking that the current task chains the selected task. In one embodiment, tasks are chained across multiple instances of a process. Moreover, tasks in different processes can be chained together to obtain access to the same context information and other data.

In various embodiments, the task chaining feature enables one human task to be continued with another human task. There are many scenarios in which there may be related tasks in a single BPEL process. For example, a procurement process may include a task to obtain a manager's approval for a computer, then several BPEL activities in between, and then another task for the IT department to buy the computer. The participant of the second task may want to see the approval history, comments, and attachments created when the manager approved the purchase. A user can link these different tasks in the BPEL process by chaining the second task to the first task. In one embodiment, if the chained task requires a different title, the title is set in the task instance before calling the task service reinitiate operation. If a BPEL process is initiating the tasks, the task title is set before the workflow service APIs are called. If a Java program is calling the workflow APIs programmatically, then the program can set the title.

In one embodiment, to include the task history of other tasks a user can select an "include history" checkbox to extend a previous workflow task in the BPEL process. In one embodiment, selecting this checkbox includes the task history, comments, and attachments from the previous task. This can provide the user with a complete end-to-end audit trail. When a human task is continued with another human task, the following information is carried over to the new workflow: (1) Task payload and the changes made to the payload in the previous workflow; (2) task history; (3) Comments added to the task in the previous workflow; and (4) attachments added to the task in the previous workflow. In one embodiment, the include task history from list is displayed wherein all existing workflows are listed in this display.

In another embodiment, the tasks can be chained by selecting a particular human task to extend (continue) the selected human task. For example, a hiring process is used to hire new employees. Each interviewer votes to hire or not hire a candidate. If 75% of the votes are to hire, then the candidate is hired; otherwise, the candidate is rejected. If the candidate is to be hired, an entry in the HR database is created and the human resources contact completes the hiring process. The HR contact also must see the interviewers and the comments they made about the candidate. This process can be modeled using a parallel participant type for the hiring. If the candidate is hired, a database adapter is used to create the entry in the HR database. After this action, a simple workflow can include the task history from the parallel participant type so that the hiring request, history, and interviewer comments are carried over. This simple workflow is assigned to the HR contact.

In one embodiment, a chained task can have different properties from the prior task, such as payload, title outcomes, and the like. When selecting a task to chain another task, the user can select whether to clear the existing payload and recreate; or whether to use the existing payload. A payload is a set of extensible markup language (XML) data attributes associated with each task of the BPEL process. The "clear existing payload" option is applicable when the payload attributes in the XML files of the human tasks involved in this extended workflow are different. For example, this option would apply if the payload attribute for the human task whose history is being included has a number of extra attributes than the payload of the other human task. The "use existing payload" option, on the other hand, is applicable when the payload attributes in the XML files of the human tasks involved in this extended workflow are the same.

FIG. 1 is an illustration of a BPEL system in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the BPEL system includes a process designer component 102 that can be used within some form of an integrated development environment (IDE) 104, as well as a process manager component 100 that can be deployed on an application server 114. The BPEL system can be used to graphically compose and execute BPEL processes 106 that orchestrate and invoke the functionality of various heterogeneous applications, systems and services in a coordinated fashion.

The BPEL Process Manager 100 is a tool for designing and running business processes. This component provides a comprehensive, standards-based tool for creating, deploying and managing cross-application business processes with both automated and human workflow steps in a service-oriented architecture. In one embodiment, the BPEL Process Manager is able to connect to external systems and processes and contains support for a variety of presentation technologies. The BPEL Process Manager can be used for integrating applications and legacy systems, composing coarse grained services from finer grained services, building process centric composite applications, automating business processes, and workflow applications including sophisticated routing and escalation.

In one embodiment, the process manager 100 includes integrated business process management (BPM) services 108, such as workflows, decision services and sensors; a core BPEL engine 110 that executes the processes; and the Web Services Description Language (WSDL) binding component 112 that binds the processes deployed on the process manager to various external web services and other systems. In one embodiment, the process manager can be deployed on a standard J2EE application server 114.

In various embodiments, the Process Designer 102 component provides a graphical user interface for building BPEL processes. In one embodiment, the designer uses BPEL as its native format. It can be used to set up simple and complex human workflow steps, configure adapters to various systems, and define complex transformation maps. In addition, developers can view and modify the BPEL source by using the process designer. In one embodiment, the process designer can be integrated into a standard integrated development environment (IDE), such as JDeveloper available from Oracle Corporation.

The BPEL system can include a repository 118 that stores the data associated with BPEL processes. In various embodiments, the data can include but is not limited to: process definitions, task settings and metadata, task runtime data such as history and attachments, context information, as well as various task payload and parameters. In various embodiments, the data can be stored in one repository or separated into several repositories.

In addition, the BPEL system can include a process console 116 that can be used by various users 132 to access running instances of BPEL processes. The users can include end users that can view and act on tasks, process owners that can monitor the progress of the running processes and workflow administrators that can administer tasks, workload, identify errored tasks and the like.

Figure 2:
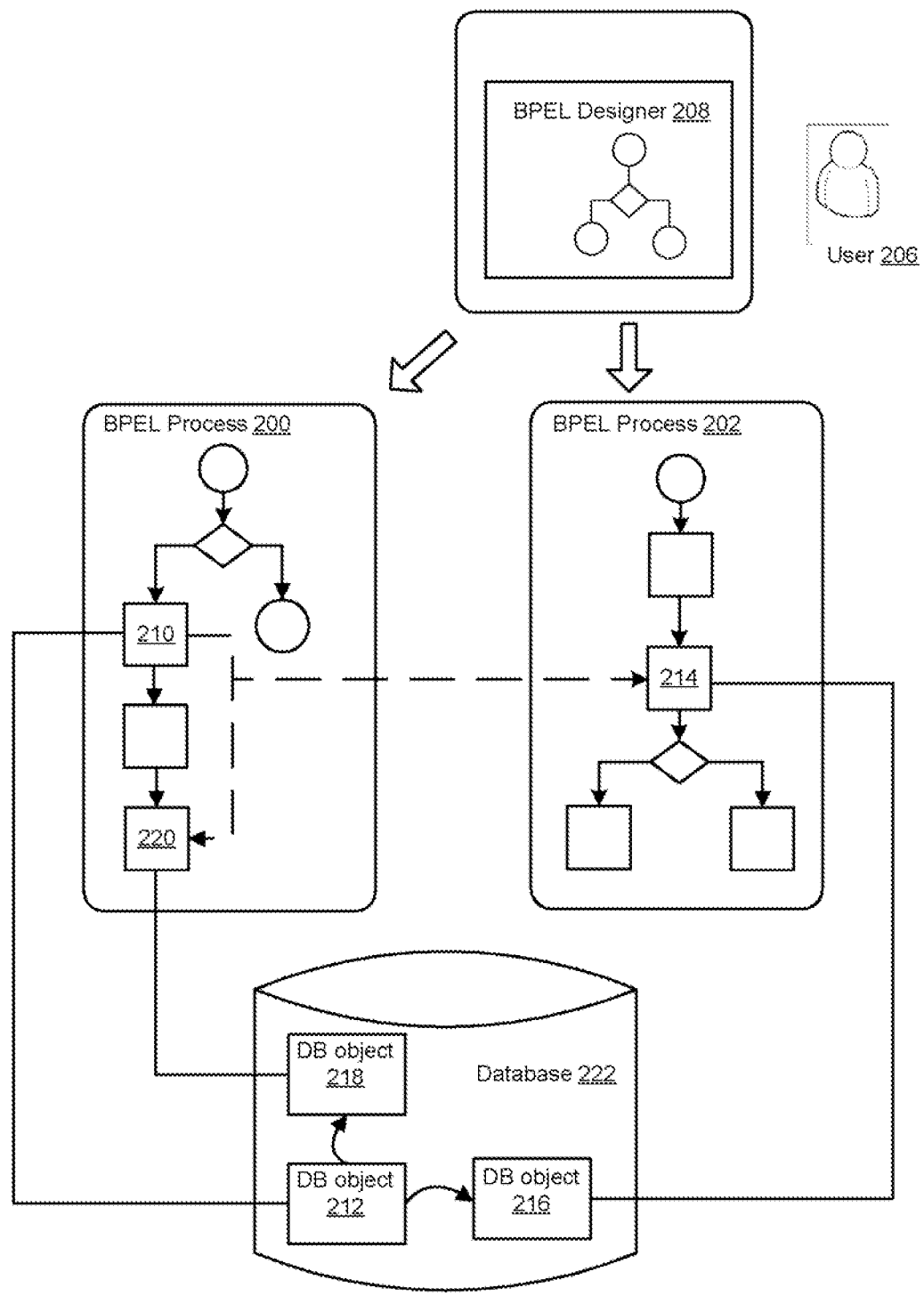
FIG. 2 is an illustration of a BPEL system implementing task chaining, in accordance with various embodiments of the invention.

FIG. 2 is an illustration of a BPEL system implementing task chaining, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the process designer 208 can be used by the process creator 206 to define a plurality of process definitions. In this particular illustration, two processes are shown as having been created using the designer—process 200 and process 202. Each of these processes can be composed of a plurality of tasks, including both human based tasks and automated tasks. Human tasks are tasks that require user input to complete, while automated tasks are performed entirely by invoking automated systems, without the need for user input.

In one embodiment, the human tasks can be chained together within a single process or between several processes or process instances. For example, as illustrated in this figure, task 210 can be chained with task 214, as well as task 220. For example, the chaining can be performed by checking an "include history from other task" option. Each task can be represented by an object stored in the database (212, 216, 218), which maintains various data for the task. The database objects can store the task history data, a set of attachments for the task, comments associated with the task, metadata and settings for the task, as well as other information. In various embodiments, the chaining between tasks can be implemented in two alternative ways.

In the preferred implementation illustrated in FIG. 2, when a task is chained to another task, a reference is created from the database object representing one task to the object representing another task. For example, when the task 210 is chained to task 214 during process modeling, separate objects 212 and 216 are created to store information for the tasks and a reference is associated between object 212 and object 216. Thereafter, during runtime, when a query mechanism is used to query data from task 214, the mechanism retrieves not only data associated with task 214, but also the data (history, attachments, comments, context, etc) associated with task 210.

In an alternative implementation, a single database object can be used to maintain the data for each process instance. A state diagram is associated with the object. The state diagram can indicate the status of the task, such as "assigned" or "completed." When the task completes, the state diagram can indicate the completed status and can be no longer accessible for the query mechanism. In this alternative implementation, when one task of the process is chained to another, the task status could then be changed from "completed" back to "assigned" so that the history and attachments of the previous (chained) task are accessible to the new task being executed. One disadvantage with this implementation, however, may occur in the audit trail for the process, where various tasks may not seem to ever reach the complete status due to the chaining between the tasks. In certain embodiments, it may be desirable to modify the audit and/or logging systems to account for this possibility.

Figure 3:
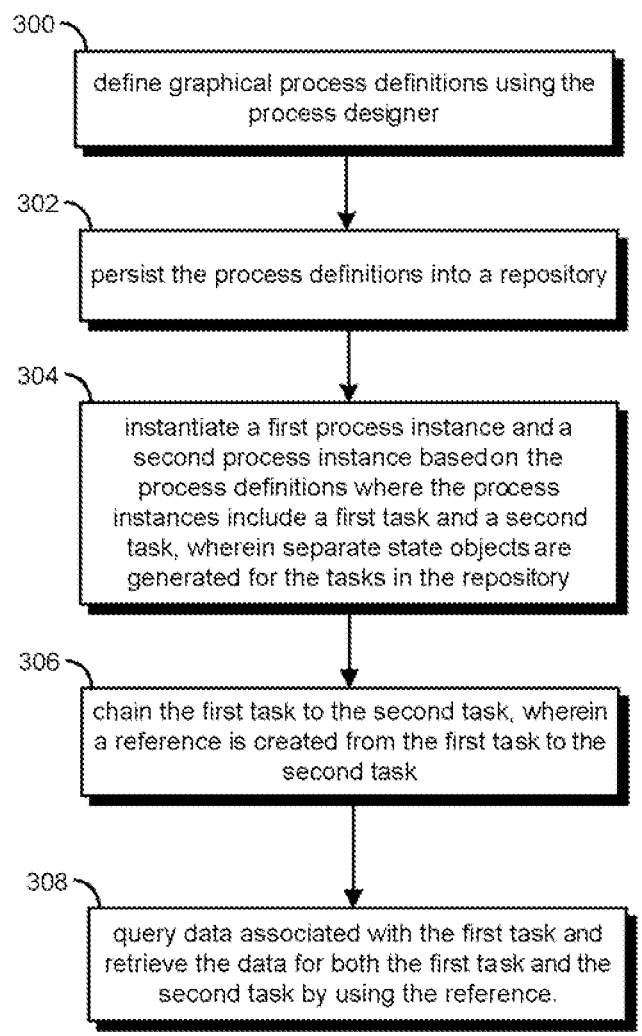
FIG. 3 is a flow chart diagram of the high level process for chaining tasks, in accordance with various embodiments of the invention.

FIG. 3 is a flow chart diagram of the high level process for chaining tasks, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, a user responsible for creating the process can use the process designer to define a set of graphical process definitions. These process definitions are then stored in a repository, as shown in step 302. The repository can be implemented as a database, disk storage or any other form of persistent storage.

As shown in step 304, the process instances can be instantiated from the definitions. In particular, a first process instance and a second process instance are instantiated, wherein the process instances include a first task and a second task and wherein separate state objects are generated for the tasks in the database. In various embodiments, the first task and the second task can be in the same process instance or in different processes or instances.

As shown in step 306, the first task and the second task can be chained together. This chaining can be accomplished by creating a reference from the database state object associated with the first task to the state object associated with the second task. Thereafter, when a query is received for data associated with the first task, the data for both the first task and the second task by can be retrieved by using the reference (step 308). In various embodiments, the data includes the history, attachments and comments associated with the previous task.

Figure 4:
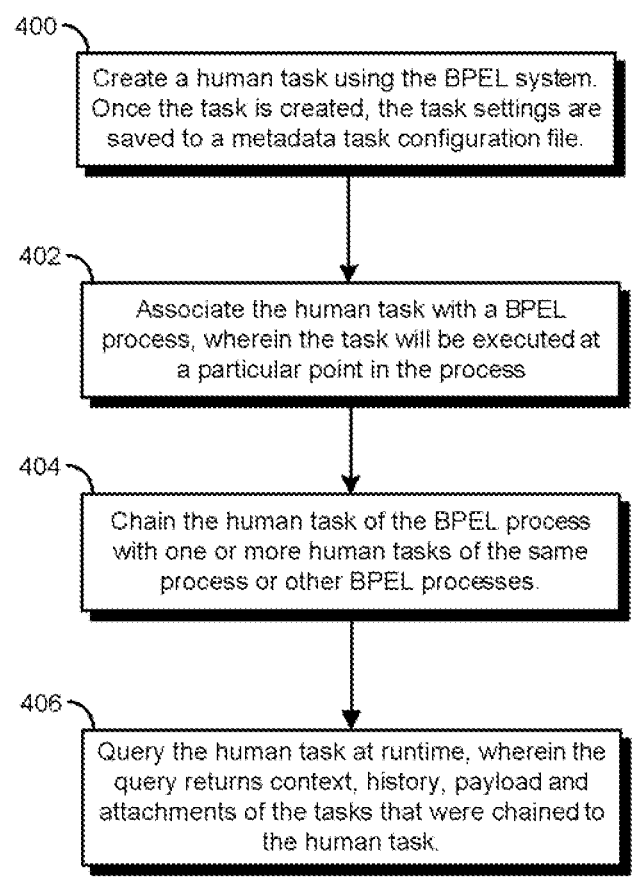
FIG. 4 is a flow chart diagram of an alternative view of chaining tasks in a process, in accordance with various embodiments of the invention.

FIG. 4 is a flow chart diagram of an alternative view of chaining tasks in a process, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, a human task can be created using the BPEL system and its task settings can be saved to a metadata task configuration file. As previously mentioned, human tasks are the tasks of the BPEL process that will require interaction with an end user. In one embodiment, a human task is defined by using an editor that allows enables the task creator to specify the task metadata, such as task outcome, payload structure (message elements of the data in the task), assignment and routing policy, expiration and escalation policy, notification settings and the like. In one embodiment, this information is then saved to a metadata task configuration file with a .task extension. This .task file containing the human task settings can then be associated with a particular BPEL process, by using the process designer component, as shown in step 402. It is possible for the task creator to specify the task definition, task initiator, task priority and task parameter mappings that carry the input data to a BPEL variable. In addition, the task designer can specify more advanced features, such as the scope and global task variable names, task owner, identification key, BPEL callback customizations, and whether to extend this human task to include other workflow tasks.

As shown in step 404, the human task of the BPEL process can be chained with one or more human tasks of the same process or other BPEL processes. For example, the tasks can be chained by selecting a tab such as "Include task history from" tab and then selecting a particular human task to chain. In one embodiment, when a human task is chained to another human task, the following is carried over to the new workflow: task payload and the changes made to the payload in the previous workflow; task history; comments added to the task in the previous workflow; and attachments added to the task in the previous workflow. In one embodiment, during the chaining of the task, the user can also specify whether to clear the old payload or to use the existing payload in the current task. For example, if the payload attributes in the current task are different from the prior task being chained, then the payload should be cleared. If the payload attributes are the same, on the other hand, it may be desirable to use the existing payload.

As shown in step 406, when a human task is queried, the information is returned not only from the queried task, but also from the previous task. This allows the human tasks to be continued. In various embodiments, the advantages of chaining the tasks can allow (1) mixing of human tasks and automated activities, (2) continuity of tasks across processes, (3) unstructured routing across tasks and processes, (4) easy options for process modelers to indicate task chaining without having to write explicit code to copy data, (5) the notion of tasks chaining can be system supported and hence the overall system like task retrieval reacts to this feature (6) eliminating duplication of data like comments and attachments.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions. In one embodiment, the computer readable storage medium is non-transitory.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. In particular, although several of the embodiments described above illustrate the use of the Oracle Human Workflow system, and the use of BPEL, it will be evident that other human workflow or workflow systems, and other flow languages can be used. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for chaining tasks in a process execution environment, said method comprising:
   providing a graphical user interface (GUI) for defining one or more business process execution language (BPEL) process definitions each including a set of tasks;
   persisting the one or more BPEL process definitions in a repository;
   deploying a BPEL process defined by one of the one or more BPEL process definitions to a BPEL process manager operating on one or more microprocessors, the BPEL process manager including a BPEL process engine;
   instantiating, using the BPEL process engine, a first process instance and a second process instance based on said BPEL process, wherein the BPEL process engine orchestrates and invokes functionality of applications, systems and Web services based on the BPEL process;
   wherein the first process instance includes a first task and a first state object generated within the repository for the first task;
   wherein the second process instance includes a second task and a second state object generated within the repository for the second task, wherein the second task is associated with context data which includes data relating to performance of the second task including one or more of task history and attachments which are not available from the first process instance;
   chaining the first task of the first process instance to the second task of the second process instance, by creating in the first state object associated with the first task a reference to the second state object associated with the second task;
   querying context data associated with the first task in the repository; and
   in response to querying context data associated with the first task, receiving context data for the first task from the first state object in the repository and, by using the reference in the first state object, automatically receiving the context data for the second task from the second state object in the repository, wherein the context data for the second task includes said data relating to performance of the second task including said one or more of the task history and attachments.

2. The method of claim 1, wherein at least one automated task is executed between the first task and the second task.

3. The method of claim 1, wherein chaining the first task and the second task comprises selecting, via the GUI, a previously completed first task and marking that the second task chains the first task.

4. The method of claim 1, further comprising:
   creating the first task and associating the first task with a BPEL process by using a BPEL designer component.

5. The method of claim 1, wherein a payload of a BPEL process includes a set of extensible markup language (XML) data attributes associated with each task from the set of tasks, and further comprising:
   determining whether to use or clear and recreate a set of XML data attributes associated with the first task from the payload of a business process with which the first task is associated based on a set of XML data attributes associated with the second task.

6. The method of claim 1, wherein the BPEL process manager further includes a Web Services Description Language (WSDL) binding component that binds the one or more business processes deployed on the BPEL process manager to external web services.

7. A system for chaining tasks in a process execution environment, said system comprising:
   a process designer interface used to define one or more business process execution language (BPEL) process definitions each including a set of tasks;
   a repository that persists the one or more BPEL process definitions;
   a BPEL process manager operating on one or more microprocessors, the BPEL process manager including a BPEL process engine, wherein in response to deployment of a BPEL process defined by one of the one or more BPEL processes definitions the process engine instantiates a first process instance and a second process instance based on said BPEL process, wherein the BPEL process engine orchestrates and invokes functionality of applications, systems and Web services based on the BPEL processes;
   wherein the first process instance includes a first task and a first state object generated within the repository for the first task;
   wherein the second process instance includes a second task and a second state object generated within the repository for the second task, wherein the second task is associated with context data which includes data relating to performance of the second task including one or more of task history and attachments which are not available from the first process instance;
   a reference from the first state object associated with the first task to the second state object associated with the second task created in response to chaining of the first task to the second task; and
   a query mechanism that queries context data associated with the first task, wherein in response to querying context data associated with the first task and stored in the first state object in the repository, the query mechanism retrieves context data for the first task from the first state object in the repository and, by using the reference in the first state object, automatically retrieves said context data associated with the second task from the second state object in the repository, wherein the context data for the second task includes said data relating to performance of the second task including said one or more of the task history and attachments.

8. The system of claim 7, wherein at least one automated task is executed between the first task and the second task.

9. The system of claim 7, wherein said interface is a graphical user interface (GUI), wherein receiving input indicative that the first task of the first process instance comprises selecting, via the graphical user interface (GUI), a previously completed first task and marking that the second task chains the first task.

10. The system of claim 7, further comprising a process designer component, wherein the first task is created by using the process designer component and associated with the first process instance.

11. The system of claim 7, wherein a payload of a BPEL process includes a set of extensible markup language (XML) data attributes associated with each task from the set of tasks, and wherein the query mechanism determines whether to use or clear and recreate a set of XML data attributes associated with the first task from the payload of a business process with which the first task is associated based on a set of XML data attributes associated with the second task.

12. The system of claim 7, wherein the BPEL process manager further includes a Web Services Description Language (WSDL) binding component that binds the one or more business processes deployed on the BPEL process manager to external web services.

13. A non-transitory computer-readable storage medium carrying one or more sequences of instructions for chaining tasks in a process execution environment, which instructions, when executed by one or more processors, cause the one or more processors to perform steps comprising:

providing a graphical user interface (GUI) for defining one or more business process execution language (BPEL) process definitions each including a set of tasks;

persisting the one or more BPEL process definitions in a repository;

deploying a BPEL process defined by one of the one or more BPEL process definitions to a BPEL process manager operating on one or more microprocessors, the BPEL process manager including a BPEL process engine;

instantiating, using the BPEL process engine, a first process instance and a second process instance based on said BPEL process, wherein the BPEL process engine orchestrates and invoke functionality of applications, systems and Web services based on the BPEL process;

wherein the first process instance includes a first task and a first state object generated within the repository for the first task;

wherein the second process instance includes a second task and a second state object generated within the repository for the second task, wherein the second task is associated with context data which includes data relating to performance of the second task including one or more of task history and attachments which are not available from the first process instance;

chaining the first task of the first process instance to the second task of the second process by creating, in the first state object associated with the first task a reference to second state object associated with the second task;

querying context data associated with the first task and stored in the first state object in the repository; and in response to querying context data associated with the first task, receiving context data for the first task from the first state object in the repository, and by using the reference in the first state object, automatically receiving said context data associated with the second task from the second state object in the repository, wherein the context data for the second task includes said data relating to performance of the second task including said one or more of the task history and attachments.

14. The non-transitory computer-readable storage medium of claim 13, wherein a payload of a BPEL process includes a set of extensible markup language (XML) data attributes associated with each task from the set of tasks, the non-transitory computer-readable storage medium carrying one or more sequences of instructions for chaining tasks in a process execution environment, which instructions, when executed by one or more processors, cause the one or more processors to perform steps further comprising:

determining whether to use or clear and recreate a set of XML data attributes associated with the first task from the payload of a business process with which the first task is associated based on a set of XML data attributes associated with the second task.

15. The non-transitory computer-readable storage medium of claim 13, carrying one or more sequences of instructions for chaining tasks in a process execution environment, which instructions, when executed by one or more processors, cause the one or more processors to perform steps further comprising:

executing at least one automated task between the first task and the second task.

16. The non-transitory computer-readable storage medium of claim 13, carrying one or more sequences of instructions for chaining tasks in a process execution environment, which instructions, when executed by one or more processors, cause the one or more processors to perform steps further comprising:

providing a processor designer component which provides the graphical user interface (GUI) wherein enables chaining of the first task and the second task by selecting the first task and marking that the second task chains the first task.

17. The non-transitory computer-readable storage medium of claim 13, carrying one or more sequences of instructions for chaining tasks in a process execution environment, which instructions, when executed by one or more processors, cause the one or more processors to perform steps further comprising:

creating the first task and associating the first task with the first process instance using a BPEL designer component; and creating the second task and associating the second task with the second process instance using the BPEL designer component.

18. The non-transitory computer-readable storage medium of claim 13, carrying one or more sequences of instructions for chaining tasks in a process execution environment, which instructions, when executed by one or more processors, cause the one or more processors to perform steps further comprising:

binding the one or more business process deployed on the BPEL process manager a Web Services Description Language (WSDL) binding component.

* * * * *

UNITED STATES PATENT AND TRADEMARK OFFICE
CERTIFICATE OF CORRECTION

| | | |
|---|---|---|
| PATENT NO. | : 9,589,240 B2 | Page 1 of 1 |
| APPLICATION NO. | : 12/780661 | |
| DATED | : March 7, 2017 | |
| INVENTOR(S) | : Rangaswamy et al. | |

It is certified that error appears in the above-identified patent and that said Letters Patent is hereby corrected as shown below:

On the Title Page

On page 2, Column 2, under Other Publications, Line 5, delete "Launchs" and insert -- Launches --, therefor.

On page 2, Column 2, under Other Publications, Line 6, delete "Processs" and insert -- Process --, therefor.

On page 2, Column 2, under Other Publications, Line 17, delete "Hamburn-" and insert -- Hamburg- --, therefor.

On page 2, Column 2, under Other Publications, Line 18, delete "Verion" and insert -- Version --, therefor.

On page 2, Column 2, under Other Publications, Line 26, delete "Standarind" and insert -- Standard --, therefor.

In the Specification

In Column 2, Line 40, delete "coments" and insert -- comments --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*